United States Patent Office 3,356,673
Patented Dec. 5, 1967

3,356,673
NON-SULFONATED MONO AZO AMINO PYRAZOLE DYESTUFFS
Francois Favre, Basel, and Paul Lienhard, Riehen, Switzerland, assignors to J. R. Geigy, A.G., Basel, Switzerland
No Drawing. Filed Aug. 20, 1964, Ser. No. 391,018
Claims priority, application Switzerland, Aug. 27, 1963, 10,631/63
5 Claims. (Cl. 260—163)

ABSTRACT OF THE DISCLOSURE

Dyestuffs of the formula $$A-N=N-C-C-O-R$$
$$H_2N-C\phantom{xxx}N$$
$$\phantom{xxxxx}N$$
$$\phantom{xxxxx}|$$
$$\phantom{xxxxx}B$$

wherein A is nitrophenyl which may be additionally appropriately substituted, B is a monovalent aliphatic, cycloaliphatic, araliphatic or aromatic radical, and R is lower alkyl, are suitable for dyeing polyester fibers, the high fastness to light of the resultant dyeings being stable to carriers. The dyes are non-sulfonated and non-metallizable and are applied from aqueous dispersion.

---

The present invention concerns new non-sulfonated azo dyestuffs which can be dispersed in water, a process for the producton thereof, a process for the dyeing of hydrophobic organic fibers using the new dyestuffs and, as industrial product, the material dyed with the aid of these dyestuffs.

In order to obtain dyeings with disperse dyestuffs on polyglycol terephthalate fibers of sufficient color strength, the addition of carriers while dyeing at 90–98° is indispensable. Unfortunately, these carriers often adversely affect the fastness to light of the dyeings on this material to a considerable extent. This is true in particular of the carriers based on phenylphenol which are very generally used. To counter this drawback the carrier must be completely removed from the goods by repeated thorough washing, by steaming or by dry heat treatment.

It is for this reason that dyestuffs suitable for the dyeing of polyester fibers, the high fastness to light of which is not influenced by the carriers defined above, are particularly valuable.

It has now been found that such dyestuffs the fastness to light of which on polyglycol terephthalate fibers is surprisingly stable to carriers, especially to those of the types defined hereinafter, are obtained by coupling a diazonium compound of an aromatic amine of the formula $$A-NH_2 \qquad (I)$$

with a coupling component of the formula $$CH-C-O-R$$
$$H_2N-C\phantom{xxx}N$$
$$\phantom{xxxxx}N$$
$$\phantom{xxxxx}|$$
$$\phantom{xxxxx}B \qquad (II)$$

to form an azo dyestuff of the formula $$A-N=N-C-C-O-R$$
$$H_2N-C\phantom{xxx}N$$
$$\phantom{xxxxx}N$$
$$\phantom{xxxxx}|$$
$$\phantom{xxxxx}B \qquad (III)$$

in which formulas—
A represents a phenyl radical which contains at least a nitro group and from 0 to 2 further electron-acceptor substituents in o- and/or p-position to the azo bond, B represents a monovalent aliphatic, cycloaliphatic, araliphatic or aromatic radical, especially alkyl of from 1 to 6 carbon atoms, cyclohexyl, benzyl, phenyl or naphthyl, and preferably phenyl, and R represents a lower alkyl group, especially methyl, the components being so chosen that the resulting dyestuff does not contain any water solubilizing group which dissociates acid in water.

Examples of electron-acceptor substituents of the phenyl radical A are: the nitro, trifluoromethyl or cyano group, halogens such as fluorine, chlorine or bromine, keto groups, particularly lower alkanoyl groups such as the acetyl or propionyl group, lower alkyl sulfonyl such as the methyl-, ethyl- or butyl-sulfonyl radicals, or sulfamyl, or sulfamyl N-mono-substituted by phenyl, or N-mono- or N-di-substituted by lower alkyl, hydroxy-lower alkyl, acyloxy-lower alkyl, particularly lower alkanoyl-oxy-lower alkyl, lower alkoxy-lower alkyl, cyano-lower alkyl or cyclohexy groups, which substituents enumerated thus far, are the preferred ones, or, furthermore, aroyl groups such as the benzoyl group, also carboxylic acid ester groups, particularly lower alkoxy-carbonyl groups such as the methoxy-carbonyl, ethoxy-carbonyl, isopropoxy-carbonyl, butoxy-carbonyl group, also phenoxy-carbonyl and cresyl-carbonyl groups, unsubstituted carbamyl N-mono-substituted by phenyl, or N-mono- or N-di-substituted by lower alkyl, hydroxy-lower alkyl, acyloxy-lower alkyl, particularly lower alkanoyl-oxy-lower alkyl, lower alkoxy-lower alkyl, cyano-lower alkyl or cyclohexyl groups, or arylsulfonyl groups such as the phenylsulfonyl group.

If B is an aliphatic radical then it is, for example, a lower alkyl group having up to 6 carbon atoms such as the methyl, ethyl, propyl, isopropyl or butyl group; if B is a cycloaliphatic radical then it is e.g. the cyclohexyl group. If B is an araliphatic radical then this preferably is phenyl-lower alkyl which contains 7 to 9 carbon atoms and is e.g. the benzyl group; if it is an aromatic radical then it in e.g. a phenyl or naphthyl radical which may be substituted, in which case the substituents are halogen such as chlorine or bromine, particularly in ortho-position to the bond to the pyrazole ring, also lower alkyl, lower alkoxy or acylamino groups, particularly lower alkanoyl-amino groups, or sulfonic acid aryl ester groups, preferably those having a mono-nuclear aryl radical, and sulfonic acid amide groups substituted at the nitrogen atom by lower alkyl.

In the preferred azo dyestuffs of Formula III: A represents a phenyl radical containing both in o- and in p-position to the azo bond an electrophilic substituent one of which is the nitro group, which phenyl radical is preferably further substituted by nitro, cyano or halogen such as fluorine, chlorine or bromine, or by alkylsulfonyl such as methylsulfonyl or ethylsulfonyl, B is the phenyl radical and R is the methyl group.

A great number of starting materials of Formula I are known. These are mainly o- or p-nitranilines containing, as further negative substituents, those defined under A. Coupling components of Formula II to be coupled therewith are obtained, for example, by reacting an alkanol corresponding to R with a cyanoacetic acid hydrazide of the formula $$B-HN-NH-CO-CH_2-C\equiv N$$

wherein B has the meaning given in Formula III, the reaction being performed in the presence of hydrogen chloride analogously to the process described in German Patent No. 1,120,453.

The coupling is performed in an acid to weakly acid medium. If desired a suitable diazonium compound can also be coupled simultaneously with a mixture of two or more coupling components usable according to the invention, or a mixture of suitable diazonium compounds can be reacted with one coupling component according to the invention.

The dyestuffs according to the invention are suitable for the dyeing of hydrophobic, synthetic organic fibers from an aqueous dispersion, for example, for the dyeing of textile material consisting of high molecular organic esters such as cellulose di- to tri-acetate, particularly however, for the dyeing of textile material made from polymeric esters of aromatic polycarboxylic acids with polyvalent alcohols, mainly polyglycol terephthalates. In some cases, light fast dyeings can be attained on polyacrylonitrile fibers with the dyestuffs according to the invention.

Polyester fibers are dyed with aqueous dispersions of the dyestuffs according to the invention preferably at temperatures of over 100° C. under pressure. Dyeing can also be performed, however, at the boiling point of the water in the presence of carriers such as phenyl phenols, polychlorobenzene compounds or similar auxiliaries, or the pad dyeing process in the foulard can be used followed by thermofixation at 180–210° C.

The dyeings on polyglycol terephthalate fibers obtained with the dyestuffs according to the invention in the presence of phenyl phenols, polychlorobenzene compounds or mixtures of terephthalic acid esters and benzamides as carrier are considerably more light fast than dyeings obtained with dyestuffs of similar construction under the same conditions. This is true, in particular, of the dyestuffs obtained by coupling the diazonium compounds of 1-amino-2-nitro-4-methylsulfonyl-benzene or 1-amino-2-nitro-4-ethylsulfonylbenzene or 1 - amino - 2,4 - dinitrobenzene with 1-phenyl-3-methoxy-5-aminopyrazole, or those in which the phenyl radical in the coupling component is substituted by chlorine, lower alkyl, especially methyl, or alkoxy, especially methoxy.

In addition the azo dyestuffs according to the invention have good fastness to sublimation and have good drawing power onto polyglycol terephthalate fibers.

In some cases the drawing power of the dyestuffs can be still further improved by mixing two or more monoazo dyestuffs according to the invention.

"Lower" as used in this application and the appended claims in connection with alkyl, alkoxy or alkanoyl means that these radicals have not more than 4 carbon atoms.

Example 1

21.6 parts of 1-amino-2-nitro-4-methylsulphonylbenzene are dissolved in 70 parts of concentrated sulphuric acid and the solution is diazotised for 10 hours at 10–15° with nitrosyl sulphuric acid, corresponding to 6.9 parts of sodium nitrite. The diazonium salt solution so obtained is added dropwise at 12–14° to a solution of 18.9 parts of 1-phenyl-3-methoxy-5-aminopyrazole in 250 parts of glacial acetic acid and 300 parts of water. After 1 hour, the reaction mass is buffered with sodium acetate to a pH 4–4.5. On completion of the coupling, the precipitate formed is filtered off, washed neutral with water and dried in vacuo at 60°. The dyestuff is an orange-coloured powder, the composition of which corresponds to the formula

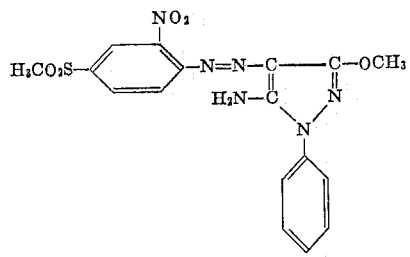

The dyestuff ground with the sodium salt of a condensation product of naphthalene sulphonic acids and formaldehyde, dyes polyglycol terephthalate fibres from an aqueous dispersion in the presence of o-phenylphenol in vivid orange shades. The bath is substantially exhausted. The dyeings have excellent fastness to washing, sublimation and light.

The 1-phenyl-3-methoxy-5-aminopyrazole used as coupling component is prepared according to the methods described in the German published application No. 1,120,453 by introducing anhydrous gaseous hydrochloric acid into a solution of cyanoacetic acid phenyl hydrazide in methanol.

If in the above example, instead of the 18.9 parts of 1-phenyl-3-methoxy-5-aminopyrazole, equivalent amounts of the coupling components given in Table I are used and they are coupled with equivalent amounts of the diazonium compounds of the diazo components given in the same table as described in this example, then dyestuffs are obtained which produce similarly fast dyeings on polyglycol terephthalate fibres.

TABLE I

| No. | Diazo component | Coupling component | Shade on polyglycol terephthalate fibres |
|---|---|---|---|
| 2 | 1-amino-2-nitro-4-methylsulphonylbenzene | 1-phenyl-3-ethoxy-5-aminopyrazole | Orange. |
| 3 | 1-amino-2-nitrobenzene-4-sulphonic acid phenyl ester | do | Do. |
| 4 | 1-amino-2-nitro-4-phenylsulphonylbenzene | do | Do. |
| 5 | 1-amino-2-nitro-4-ethylsulphonylbenzene | do | Do. |
| 6 | do | 1-(4'-methoxyphenyl)-3-methoxy-5-aminopyrazole | Do. |
| 7 | 1-amino-2-nitro-4-n-propylsulphonylbenzene | 1-phenyl-3-methoxy-5-aminopyrazole | Do. |
| 8 | 1-amino-2-nitro-4-n-butylsulphonylbenzene | do | Do. |
| 9 | do | 1-(4'-chlorophenyl)-3-methoxy-5-aminopyrazole | Do. |
| 10 | 1-amino-2-nitro-4-phenylsulphonylbenzene | 1-phenyl-3-methoxy-5-aminopyrazole | Do. |
| 11 | do | 1-(4'-bromophenyl)-3-methoxy-5-aminopyrazole | Do. |
| 12 | 1-amino-2-nitrobenzene-4-sulphonic acid phenyl ester | do | Do. |
| 13 | 1-amino-2-nitrobenzene-4-sulphonic acid-4'-methylphenyl ester | 1-(4'-chlorophenyl)-3-methoxy-5-aminopyrazole | Do. |
| 14 | 1-amino-2-nitrobenzene-4-sulphonic acid-4'-methoxyphenyl ester | 1-phenyl-3-methoxy-5-aminopyrazole | Do. |
| 15 | 1-amino-2-nitrobenzene-4-sulphonic acid-4'-chlorophenyl ester | do | Do. |
| 16 | 1-amino-2-nitrobenzene-4-sulphonic acid-4'-bromophenyl ester | do | Do. |
| 17 | do | 1-(4'-chlorophenyl)-3-methoxy-5-aminopyrazole | Do. |

The following non-limitative examples illustrate the invention further. Where not otherwise expressly stated, parts are given therein as parts by weight. The temperatures are in degrees centigrade. The relationship of parts by weight to parts by volume is that of grams (g.) to mililiters (ml.).

Example 18

18.3 parts of 1-amino-2,4-dinitrobenzene in 40 parts of concentrated sulphuric acid are diazotised for 10 hours at 10–15° in the usual way with nitrosyl sulphuric acid, corresponding to 6.9 parts of sodium nitrite.

The diazonium salt solution obtained is added dropwise to a slurry from 18.9 parts of 1-phenyl-3-methoxy-5- aminopyrazole in 500 parts of water, 120 parts of sodium acetate, 1000 parts of ice and 2 parts of an addition product of 20 mols of ethylene oxide to oleyl alcohol.

The dyestuff formed is filtered off under suction, washed neutral and dried in vacuo at 60°. It precipitates in the form of an orange coloured powder; its composition corresponds to the formula

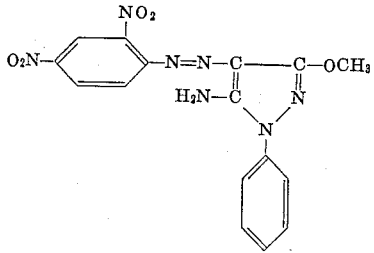

When milled with sodium dodecylbenzene sulphate, it dyes polyglycol terephthalate fibres from an aqueous dispersion in the presence of dichlorobenzene in vivid orange shades. The dyeings have excellent fastness to washing, sublimation and light.

If, instead of the 18.9 parts of 1-phenyl-3-methoxy-5-aminopyrazole, equivalent amounts of the coupling components given in Table II are used and these are coupled with equivalent amounts of the diazonium compounds mentioned in the same table by the method described in the example, then dyestuffs are obtained which produce dyeings on polyglycol terephthalate fibres having similarly good properties.

diazotised for 5 hours at 0–5° with nitrosyl sulphuric acid, corresponding to 6.9 parts of sodium nitrite. At 4–6°, the diazonium salt solution is poured into a solution of 18.9 parts of 1-phenyl-3-methoxy-5-aminopyrazole in 250 parts of glacial acetic acid and 150 parts of water. The red-orange dyestuff which precipitates is filtered off, washed neutral with a lot of water and dried in vacuo at 60–70°.

The dyestuff corresponds to the formula

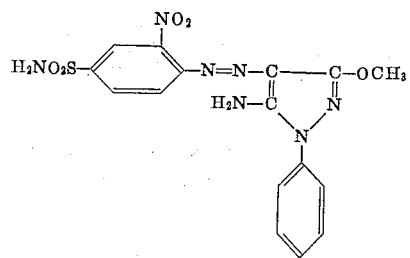

When milled with the sodium salt of a condensation product of naphthalene sulphonic acid and formaldehyde, the dyestuff dyes polyglycol terephthalate fibres in the presence of chlorobenzene in orange shades. The dyeings have good fastness to washing, light and sublimation.

If in the above example, instead of the 18.9 parts of 1-phenyl-3-methoxy-5-aminopyrazole, equivalent amounts of the coupling components given in Table III are used and these are coupled with equivalent amounts of the diazonium compounds of the diazo components given in this table according to the method described in this example, then dyestuffs are obtained which produce dyeings on polyglycol terephthalate fibres having similarly good properties.

TABLE II

| No. | Diazo component | Coupling component | Shade on polyglycol terephthalate fibres |
|---|---|---|---|
| 19 | 1-amino-2,4-dinitrobenzene | 1-(4'-methylsulphonylphenyl)-3-methoxy-5-aminopyrazole | Orange. |
| 20 | do | 1-(4'-ethylsulphonylphenyl)-3-methoxy-5-aminopyrazole | Do. |
| 21 | 1-amino-2-nitro-4-trifluoromethylbenzene | 1-phenyl-3-methoxy-5-aminopyrazole | Do. |
| 22 | 1-amino-2-trifluoromethyl-4-nitrobenzene | 1-(2'-chlorophenyl)-3-methoxy-5-aminopyrazole | Do. |
| 23 | 1-amino-4-nitrobenzene-2-carboxylic acid methyl ester | do | Do. |
| 24 | 1-amino-4-nitrobenzene-2-carboxylic acid ethyl ester | do | Do. |
| 25 | 1-amino-4-nitrobenzene-2-carboxylic acid-n-propyl ester | 1-phenyl-3-methoxy-5-aminopyrazole | Do. |
| 26 | 1-amino-4-nitrobenzene-2-carboxylic acid-n-butyl ester | do | Do. |
| 27 | 1-amino-4-nitrobenzene-2-carboxylic acid phenyl ester | do | Do. |
| 28 | 1-amino-6-chloro-2,4-dinitrobenzene | do | Do. |
| 29 | 1-amino-6-bromo-2,4-dinitrobenzene | do | Do. |
| 30 | 1-amino-2-nitro-4-sulphonic acid phenyl ester | do | Do. |

*Example 31*

21.7 parts of 1-amino-2-nitrobenzene-4-sulphonic acid amide in 120 parts of concentrated sulphuric acid are

TABLE III

| No. | Diazo component | Coupling component | Shade on polyglycol terephthalate fibres |
|---|---|---|---|
| 32 | 1-amino-2-nitrobenzene-4-sulphonic acid methyl amide | 1-phenyl-3-methoxy-5-aminopyrazole | Orange. |
| 33 | do | 1-phenyl-3-ethoxy-5-aminopyrazole | Do. |
| 34 | 1-amino-2-nitrobenzene-4-sulphonic acid dimethylamide | 1-phenyl-3-methoxy-5-aminopyrazole | Do. |
| 35 | do | 1-(4'-bromophenyl)-3-methoxy-5-aminopyrazole | Do. |
| 36 | 1-amino-2-nitrobenzene-4-sulphonic acid-N-β-hydroxyethylamide | 1-(4'-methylphenyl)-3-methoxy-5-aminopyrazole and 1-(2'-methylphenyl)-3-methoxy-5-aminopyrazole. | Do. |
| 37 | 1-amino-2-nitrobenzene-4-sulphonic acid-N-β-acetoxyethylamide | 1-phenyl-3-methoxy-5-aminopyrazole | Do. |
| 38 | 1-amino-2-nitrobenzene-4-sulphonic acid-N-methyl-N-cyanoethylamide | do | Do. |
| 39 | do | 1-(4'-methylphenyl)-3-methoxy-5-aminopyrazole | |
| 40 | 1-amino-2-nitrobenzene-4-sulphonic acid-N-phenylamide | 1-phenyl-3-methoxy-5-aminopyrazole | Do. |
| 41 | 1-amino-2-nitrobenzene-4-sulphonic acid-N-cyclohexylamide | do | Do. |
| 42 | 1-amino-2-nitrobenzene-4-carboxylic acid amide | do | Do. |
| 43 | 1-amino-2-nitrobenzene-4-carboxylic acid-N-methylamide | do | Do. |
| 44 | 1-amino-2-nitrobenzene-4-carboxylic acid-N,N-dimethylamide | do | Do. |
| 45 | 1-amino-2-nitrobenzene-4-carboxylic acid-N-methyl-N-β-hydroxyethylamide | do | Do. |
| 46 | 1-amino-2-nitrobenzene-4-carboxylic acid-N-methyl-N-β-acetoxyethylamide | do | Do. |
| 47 | 1-amino-2-nitrobenzene-4-carboxylic acid-N-(methoxypropyl)-amide | do | Do. |
| 48 | 1-amino-2-nitrobenzene-4-carboxylic acid-N-phenylamide | do | Do. |
| 49 | 1-amino-2-nitrobenzene-4-carboxylic acid-N-cyclohexylamide | do | Do. |

Example 50

17.25 parts of 1 amino-2-chloro-4-nitrobenzene in 150 parts of water and 25 parts of concentrated hydrochloric acid are diazotised at 5–7° with 6.9 parts of sodium nitrite in 50 parts of water. The diazonium compound is poured while stirring into a solution of 18.9 parts of 1-phenyl-3-methoxy-5-aminopyrazole in 250 parts of glacial acetic acid and 150 parts of water. On completion of the coupling, the orange dyestuff is filtered off under suction, washed neutral with a lot of water and dried at 60°. Its composition corresponds to the formula

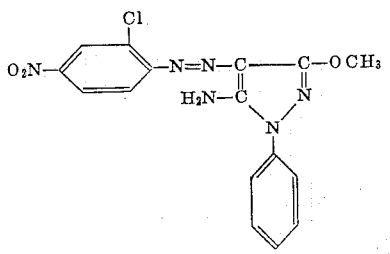

After milling with the sodium salt of a condensation product of naphthalene sulphonic acid and formaldehyde, the dyestuff dyes polyglcol terephthalate fibres in the presence of o-phenylphenol in orange shades. The dyeings have very good fastness to washing, light and sublimation.

If, instead of the 18.9 parts of 1-phenyl-3-methoxy-5-aminopyrazole, equivalent amounts of the coupling components given in Table IV are used and they are coupled as described in the example with equivalent amounts of the diazonium compounds of the diazo components given in the same table, then dyestuffs are obtained which produce polyglycol terephthalate fibre dyeings of similarly good properties.

Example 65

Polyglycol terephthalate fabric is impregnated in a foulard at 40° with a liquor of the following composition:
20 parts of the dyestuff obtained according to Example 31 finely dispersed in
7.5 parts of sodium aliginate,
20 parts of triethanolamine,
20 parts of the addition product of about 20 mols of ethylene oxide to cetyl alcohol, and
900 parts of water.

The fabric is squeezed out to a content of 100% of impregnating liquor and dried at 100° whereupon the dyeing is fixed for 30 seconds at a temperature of 210°. The dyed goods are rinsed with water, soaped and dried. Under these conditions, an orange dyeing is obtained which is fast to washing, rubbing, light and sublimation.

The dyestuffs described in the other examples produce dyeings of equal quality by this process.

We claim:

1. A non-sulfonated, non-metallizable azo dyestuff of the formula

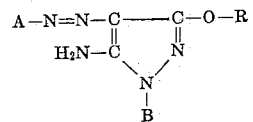

TABLE IV

| No. | Diazo component | Coupling component | Shade on polyglycol terephthalate fibres |
|---|---|---|---|
| 51 | 1-amino-4-nitrobenzene | 1-phenyl-3-methoxy-5-aminopyrazole | Orange. |
| 52 | do | 1-phenyl-3-ethoxy-5-aminopyrazole | Do. |
| 53 | 1-amino-2-bromo-4-nitrobenzene | do | Do. |
| 54 | 1-amino-2-cyano-4-nitrobenzene | do | Do. |
| 55 | 1-amino-4-nitrobenzene | 1-(1'-naphthyl)-3-methoxy-5-aminopyrazole | Do. |
| 56 | 1-amino-2-bromo-4-nitrobenzene | do | Do. |
| 57 | 1-amino-2-cyano-4-nitrobenzene | 1-phenyl-3-methoxy-5-aminopyrazole | Do. |
| 58 | 1-amino-2-fluoro-4-nitrobenzene | do | Do. |
| 59 | 1-amino-2-nitro-4-chlorobenzene | do | Do. |
| 60 | 1-amino-2,6-dichloro-4-nitrobenzene | 1-(4'-chlorophenyl)-3-methoxy-5-aminopyrazole | Do. |
| 61 | do | 1-phenyl-3-methoxy-5-aminopyrazole | Do. |
| 62 | 1-amino-2,6-dibromo-4-nitrobenzene |  |  |

Example 63

3 parts of the dyestuff obtained according to Example 1 are dispersed in 4000 parts of water.

12 parts of the sodium salt of o-phenylphenol and 12 parts of diammonium phosphate are added to this suspension and 100 parts of a polyglycol terephthalate fabric are dyed for 1½ hours at 90–95°. The dyeing is rinsed and thoroughly washed with dilute sodium hydroxide solution and a dispersing agent.

In this way, an orange dyeing which is fast to washing and sublimation and also has very good fastness to light is obtained.

Similarly good dyeings are obtained if the sodium salt of o-phenylphenol is replaced by polychlorobenzene or by a mixture of benzamide and terephthalic acid diethyl ester and otherwise the procedure given in the example is followed.

Example 64

2 parts of the dyestuff obtained according to Example 18 are finely dispersed in 4000 parts of water which contain 2 parts of an addition product of about 20 mols of ethylene oxide to oleyl alcohol. The pH of the dye bath is adjusted to 6.5 with acetic acid.

100 parts of polyester fabric are entered at 40°, the bath is heated within 15 minutes in an autoclave to 130° and kept for 45 minutes at this temperature. The dyeing is rinsed with water and soaped. An orange dyeing which is fast to light and sublimation is obtained in this way.

wherein A represents a phenyl radical which contains at least in one of the positions ortho and para to the azo bridge in nitro group and from 0 to 2 further electron acceptor substituents selected from the group consisting of nitro; trifluoromethyl; cyano; halogen; lower alkanoyl; lower alkylsulfonyl; sulfamyl; sulfamyl N-monosubstituted by phenyl; sulfamyl N-mono- or N-disubstituted by lower alkyl, hydroxy-lower alkyl, alkanoyloxy-lower alkyl, lower alkoxy-lower alkyl, cyano-lower alkyl or cyclohexyl; benzoyl; lower alkoxy-carbonyl; phenoxy-carbonyl; cresyl-carbonyl; carbamyl N-monosubstituted by phenyl; carbamyl N-mono- or N-di-substituted by lower alkyl, hydroxy-lower alkyl, lower alkanoyloxy-lower alkyl, lower alkoxy-lower alkyl, cyano-lower alkyl or cyclohexyl; and phenylsulfonyl, B is a member selected from the group consisting of alkyl of from 1 to 6 carbon atoms, cyclohexyl, benzyl, unsubstituted phenyl and unsubstituted naphthyl, and R represents lower alkyl.

2. A dyestuff of the formula
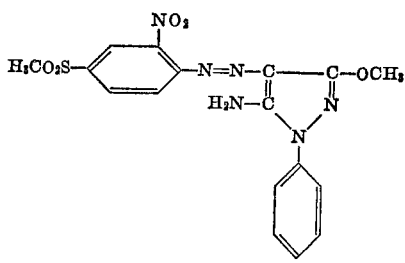
3. A dyestuff of the formula
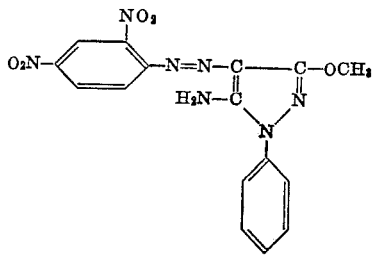
4. A dyestuff of the formula
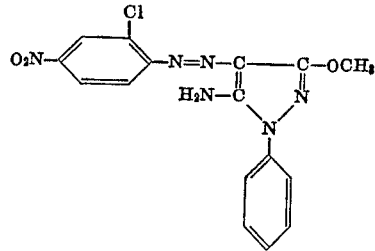
5. An non-sulfonated, non-metallizable azo dyestuff according to claim 1, wherein B is unsubstituted phenyl.
References Cited
UNITED STATES PATENTS
2,988,547   6/1961   Achelis et al. _____ 260—310 X
FOREIGN PATENTS
224,238   11/1962   Austria.
CHARLES B. PARKER, Primary Examiner.
D. M. PAPUGA, Assistant Examiner.